(12) United States Patent
Yoshioka et al.

(10) Patent No.: US 8,312,266 B2
(45) Date of Patent: Nov. 13, 2012

(54) METHODS AND APPARATUS FOR VERIFYING ELECTRONIC MAIL

(75) Inventors: Takashi Yoshioka, Kawasaki (JP);
Masahiko Takenaka, Kawasaki (JP);
Tetsuya Izu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 810 days.

(21) Appl. No.: 12/166,971

(22) Filed: Jul. 2, 2008

(65) Prior Publication Data

US 2009/0013379 A1 Jan. 8, 2009

(30) Foreign Application Priority Data

Jul. 6, 2007 (JP) ................................ 2007-178284

(51) Int. Cl.
*H04L 29/06* (2006.01)
(52) U.S. Cl. ........................................ 713/161; 713/176
(58) Field of Classification Search .................. 713/161, 713/176
See application file for complete search history.

(56) References Cited

U.S. PATENT DOCUMENTS

2007/0050713 A1* 3/2007 Yoshioka et al. ............. 715/530

FOREIGN PATENT DOCUMENTS

JP A 2005-101883 4/2005

OTHER PUBLICATIONS

Japanese Office Action dated Sep. 8, 2009, and issued in corresponding Japanese Application No. 2007-178284.
M. Takenaka; "Enhancement on Framework of Partial Integrity Assurance Technology; PIAT;" Information Processing Society of Japan (IPSJ); Proceeding of Computer Security Symposium (CSS) 2006; pp. 561-566.
E. Allman; "Domainkeys Identified Mail (DKIM) Signatures;" http://www.dkim.org/specs/rfc4871-dkimbasc.pdf, May 2007.
T. Yoshiokal; "Proposal on Partial Integrity Assurance Technology that Considers Correction and Distribution for Electronic Documents;" Information Processing Society of Japan (IPSJ); Proceeding of Forum on Information Technology (FIT) 2004; vol. 4, pp. 231-232.

* cited by examiner

*Primary Examiner* — Cordelia Zecher
(74) *Attorney, Agent, or Firm* — Greer, Burns & Crain, Ltd.

(57) ABSTRACT

A computer extracts the header information from an electronic mail, including an originality guarantee. The computer generates a header characterization for the header information subject to originality guarantee, and extracts message body information from the electronic mail and generates a body characterization for the message body information as well. The generated characterization set applies the header characterization and the body characterization, combined. The verification information is added to the generated characterization set for applying a signature, and characterization set is linked to electronic mail.

13 Claims, 12 Drawing Sheets

METHODS AND APPARATUS FOR VERIFYING ELECTRONIC MAIL

BACKGROUND OF THE INVENTION

The present invention relates to a verification information generation apparatus to verify an electronic mail, a method to generate verification information, and a verification information generation program. The invention more particularly verifies both legitimacy of an originating mail server and contents of electronic mail (e.g. sender, address, title, and message body information), and, for example, applies an electronic signature for a broadcast mail (e.g. a mail sent by mailing list) and verifies the electronic mail on the receiving side.

SUMMARY

A computer can extract header information from an electronic mail, further extracting header information, subject to originality guarantee from the extracted header information. The computer generates a characterization of the header information subject to the originality guarantee, such as a hash value, extracts message body information from the electronic mail and generates a characterization of the message body information as well. The computer generates a characterization set for the header characterization and the body characterization. The computer also links the characterization set, including verification, to the electronic mail.

DESCRIPTION OF THE EMBODIMENTS

With recent development of Information Technology, use and storage of documents for administrative purposes, ledgers of private companies and contracts have been gradually shifting from conventional paper to electronic form. More specifically, popularization of scanners has realized easy digitization of documents which used to be stored in paper form. Moreover, as image scanners with built-in high resolution have become practical, electronic storage of large amounts of paper documents has now been accepted if certain security requirements are satisfied.

With increasing demand for electronic storage of documents, the need for technology to realize secure storage and management of electronic documents has been rising. In order to electronically store documents, which used to be conventionally stored in paper form, with evidentiary credibility equivalent to conventional paper form, it is said that technical requirements such as "Detection and prevention of falsification", "Identification of author", "Access control", and "History management" must be satisfied. Conventional document management systems do not provide enough functions to satisfy the above technical requirements.

Therefore, development and commercialization of originality guarantee systems which satisfy the above technical requirements have been advanced rapidly. An electronic signature and a time stamp are the most commonly used security technology for an originality guarantee system. The electronic signature is a technology not only to identify the author of a document but also certify and verify to a third party that the document has not been changed since its creation (Non-falsification). A time stamp can certify the final save time of an electronic document in addition to its electronic signature. Major characteristics of both functions are applying an electronic signature and a time stamp for an entire document.

The conventional originality guarantee which has been realized by the above mentioned technologies is targeted for documents, for which the whereabouts of the original is clearly identified. This is the same as securely archiving the finalized form of paper documents, for example, in a book vault with a key. Under these circumstances, the electronic signature and the time stamp are effective technologies to guarantee identification and non-falsification.

Electronic mail is one of the typical technologies involving electronic information. Recently electronic mail has become an indispensable tool for all kinds of communication among companies (business), schools (education), and acquaintances.

Information devices using electronic mail include not only a personal computer but also a mobile terminal such as a mobile phone, and Personal Digital Assistant (PDA). Electronic mail is widely used and is the prevailing technology for passing electronic information.

On the other hand, problems such as contents guarantee of electronic mail and spam mail have become social issues.

As measures for contents guarantee, a method to use Secure Multipurpose Internet Mail Extensions (S/MIME; standard encryption method for electronic mail) and a related apparatus for electronic mail are known.

More specifically, the S/MIME method prevents interceptions, identity thefts, and falsifications by applying encryption and an electronic signature to a message body. The originality guarantee apparatus satisfies confidentiality requirements by applying an electronic signature to both message body information and an attached file when sending the mail, and detecting falsification at the receiving side by providing an apparatus for originality guarantee, thereby storing the message body information and the attached file in the apparatus after applying encryption and setting access control (Japan Patent published application No. 2005-101883).

Spam mail is sent by misrepresenting sender information in order to hide the identity of the sender, for example, by quoting a mail address from a header of another person's mail as the sender (From: mail address) and pretending as if the address is the spam sender's address.

As a countermeasure for such spam mail, technology (sender domain authentication technology) focused on identifying a falsified mail address has been developed.

There are two kinds of sender domain authentication technology. One uses an IP address and the other uses an electronic signature. Domain Keys Identified Mail (DKIM) is representative of sender domain authentication technology using an electronic signature.

In the DKIM method, the recipient can identify and check a server which sent a mail. More specifically, an SMTP server (sender mail server) applies an electronic signature to a mail header and the body collectively, and sends it to the recipient. Then the recipient can identify the mail server by verifying the electronic signature. Because the electronic signature is applied to the header and body collectively, fraud by quoting the header (sender (from)) can be prevented and secure mail transmission can be realized.

Issues relating to the above mentioned S/MIME method, JP '883, and the DKIM method are described below.

Because the S/MIME method does not apply an electronic signature to mail header information such as sender (From), address (To), and Title (subject), it does not provide a countermeasure for spam mail.

Technology disclosed in Japan Patent published application No. 2005-101883 focused on secure management of electronic mail by using the originality guarantee apparatus for electronic mail and guaranteeing only "contents information", meaning message body information and any attached file. Therefore even if any change or addition is made in the sender (From), address (To), and title (Subject), the sender (From), title (Subject), and contents of the message body cannot be verified individually.

The DKIM is not suitable for broadcast mailings such as mail sent through a mailing list (called ML hereunder) which automatically changes a mail header. ML is a list of electronic mail addresses so that messages can be sent only to limited readers. If a reader sends a message to the list, such message is sent to other readers as well. It is possible to send, read and reply to messages among readers registered on the list.

In ML, a mail sent to the ML address is first sent to the ML server and processed. When the ML server retransfers the mail, it often automatically changes the message body information and the header (particularly title (Subject)) which are subject to an electronic signature, and destroys the electronic signature applied when the mail was sent to the ML server. As a result, the recipient cannot verify the signature.

The present embodiment was developed to solve the above problems, and provide a verification information generation program to verify an electronic mail, apparatus to generate verification information, a related method, and a verification information generation program and related apparatus. These enable both verification of the sender mail server and mail content with regard to application of an electronic signature to an electronic mail, for example for a broadcast mail (e.g. mail sent by ML) and guarantee of the mail content (including sender, address, title, and message body information).

Preferred embodiments are explained by referring to the accompanying drawings.

Figure 1:
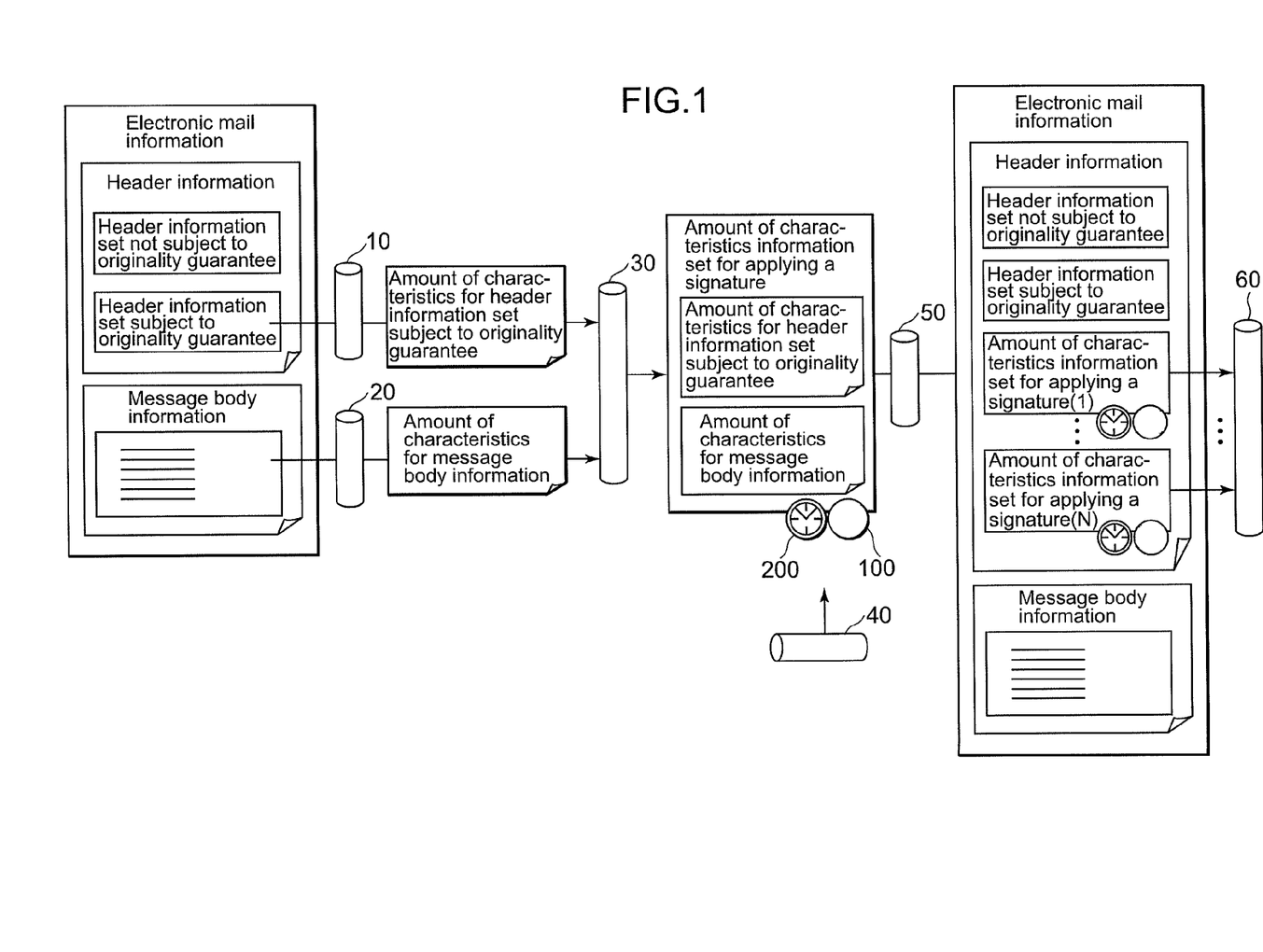
FIG. 1 is a block diagram showing overall structure according to an embodiment.
Figure 2:
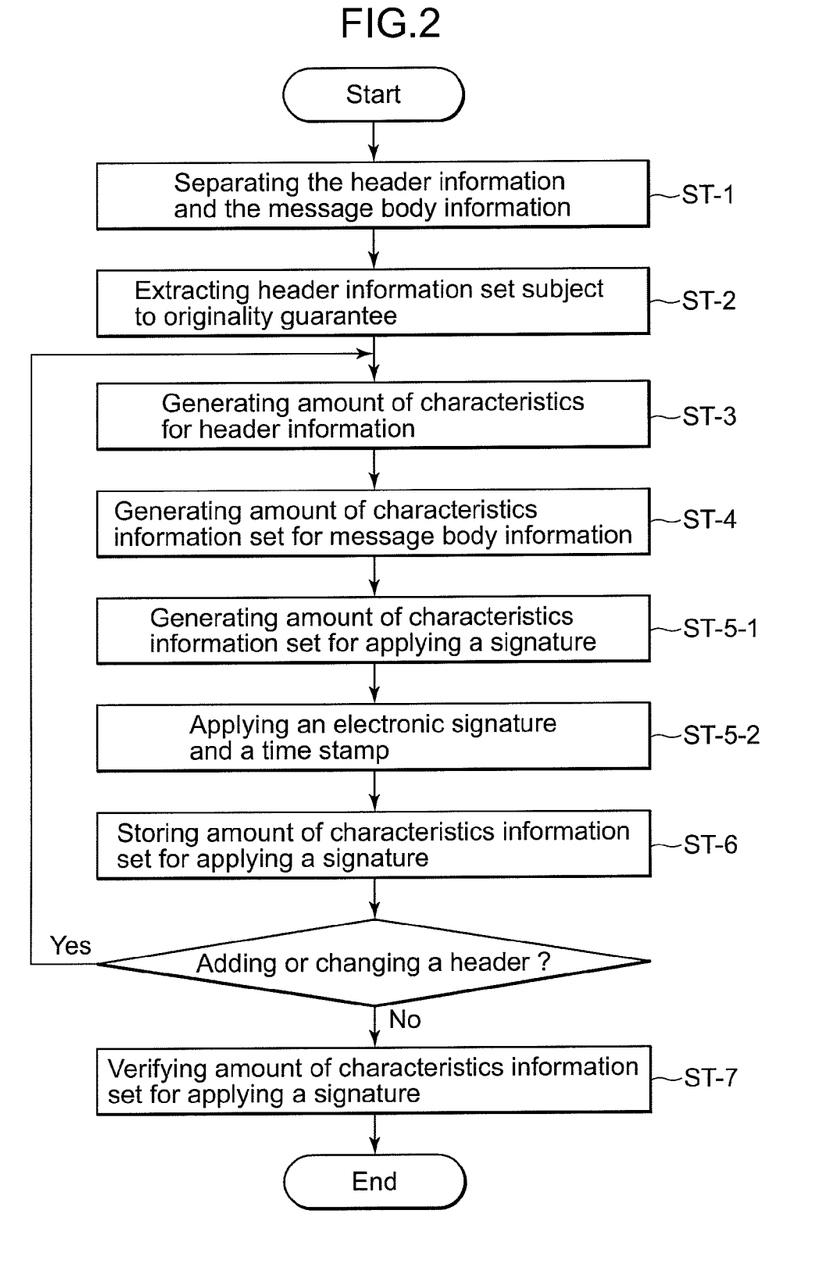
FIG. 2 is a flow chart illustrating operation according to an embodiment.

First an outline of an embodiment is described by referring to FIG. 1 and FIG. 2.

FIG. 1 is a diagram illustrating the principle or outline of embodiments of the present invention. FIG. 2 is a flow chart illustrating the operation of the invention.

Information in an electronic mail is divided into header information (including sender (From), address (To), and title (Subject)) and message body information which indicates contents of the message. Then information of the message body information is extracted (ST-1) and the header information is further separated into header information which does not require originality guarantee (contents guarantee), and one that requires originality guarantee (contents guarantee) later. Then, the header information subject to originality guarantee is extracted (ST-2).

FIG. 1 shows a process of generating a header characterization such as a hash value from header information 10 to create a header information set separate from the originality guarantee (ST-3), and the process of generating a characterization of the message body information 20 (ST-4).

Moreover the system generates a signature for a characterization set which generates signature information for header information subject to originality guarantee and the message body. The process 30 records additional information to indicate a correspondence relationship between items in addition to information on sender (From) address (To), title (Subject), and message body (Body).

The system adds verification information 40 which applies Electronic Signature 100 and Time Stamp 200 to the characterization set generated by the process of 30 (ST-5-2). It also stores the characterization set for applying a signature 50 with verification information generated by the process of 30 and 40 into header information within the electronic mail information (ST-6).

When items included in the header information subject to the originality guarantee are partly added or changed during a delivery path, ST-3, ST-4, ST-5-1, and ST-5-2 are conducted, and a new characterization set for applying a signature with verification information is generated, and stored into the header information within the electronic mail by the process of storing the characterization set 50. (ST-6)

At this time, the characterization set for applying a signature previously stored by step ST-6 is not overwritten, but sequentially stored and recorded by revision management. The system verifies the characterization set for applying a signature 60, verifies all characterization sets with verification information subject to verification and confirms whether or not a change has been made for each item (ST-7)

Figure 3:
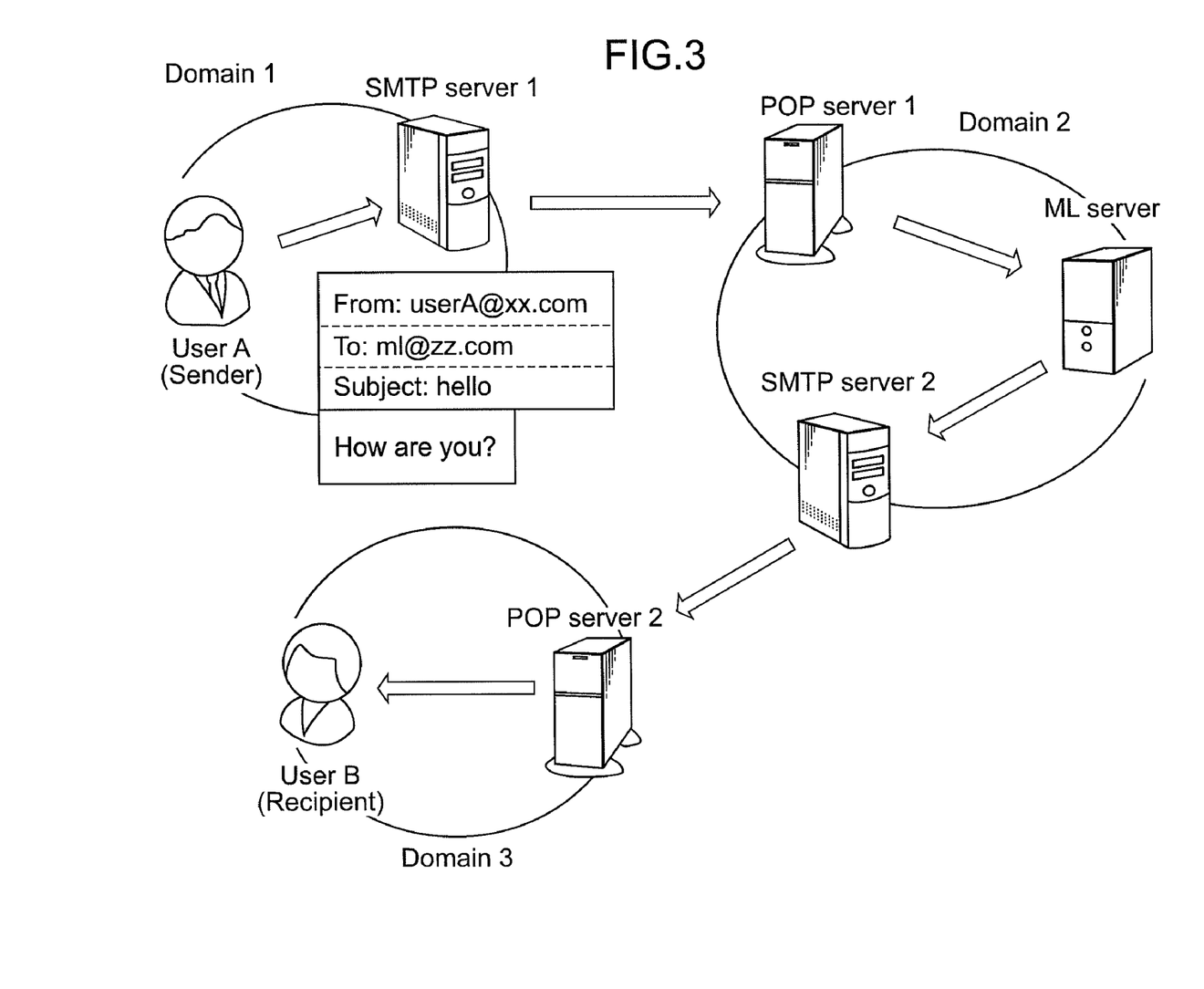
FIG. 3 is a diagram illustrating a structure according to a first embodiment.

Preferred embodiments of this invention are explained more specifically below by using FIG. 3 to FIG. 12. For the purpose of explaining one embodiment of the present information, a scenario is assumed as shown in FIG. 3 that a broadcast mail sent by User A (sender) is delivered to User B (recipient) by way of Domain 1 to Domain 3.

More specifically, it is assumed that User A (sender) creates and sends a broadcast mail with header information including Sender (From): userA@xx.com, address (To): ml@zz.com, title (Subject):hello and message body information "How are you?" and User B (recipient) confirms all changes made along the delivery route, the route which the mail followed and content verification of mail information (header information, and message body information).

Here, the broadcast mail (ml@zz.com) is assumed to be viewed and received by User B (recipient). Addition and change of header information by the ML server in Domain 2 is explained for the first embodiment in which only the Title is changed, and for the second embodiment in which sender and title are changed and X-Org-From, and X-Org-Subject are added. The header information with "X" at the beginning indicates the item uniquely added by the ML server.

The First Embodiment

Figure 4:
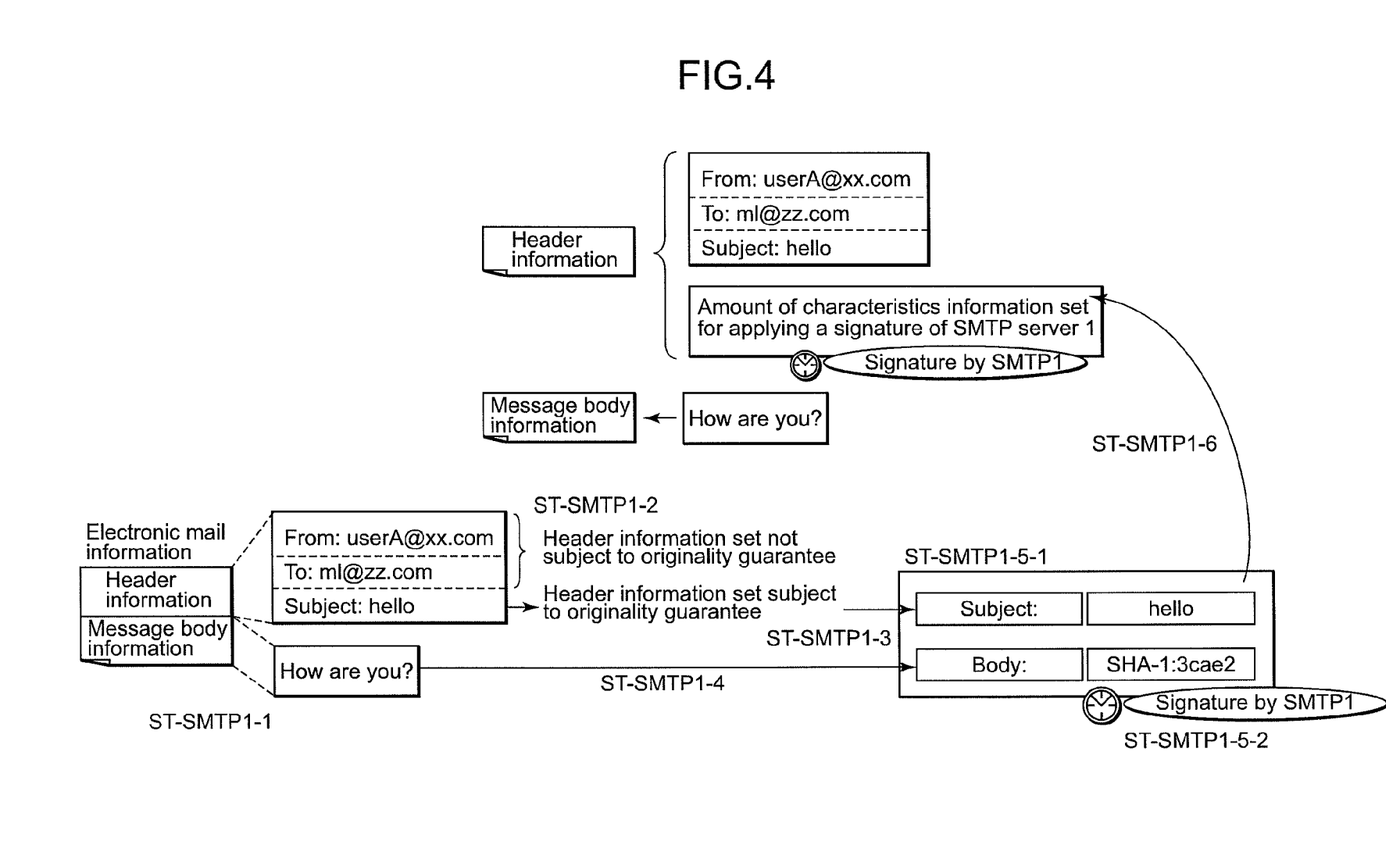
FIG. 4 is a flow chart illustrating the process to apply a signature by SMTP server 1 according to the first embodiment.

The first embodiment is explained using a scenario in which only title (Subject) is changed by the ML server in Domain 2. FIG. 4 illustrates how a signature is applied by SMTP server 1 in this embodiment.

When User A (sender) creates a piece of mail and presses a button to transmit the mail, SMTP server 1 separates header information and message body information (ST-SMTP1-1), and extracts a header information set subject to originality guarantee (ST-SMTP1-2).

At this time, a header information set not subject to originality guarantee includes sender (From), and address (To) while information subject to originality guarantee includes the title (Subject). Message body information (Body) is subject to originality guarantee as well. These selection settings can be predefined in the mail system, or set by a sender.

In this embodiment, sender (From) and address (To) are not specifically confirmed by User B (recipient), and the history of changes is disclosed to the recipient in the title (Subject) and message body information (Body).

A header characterization and a body characterization are generated for header information subject to originality guarantee extracted at ST-SMTP1-2 and for message body information (Body) (ST-SMTP1-4). In this example, the characterizations, "Subject: hello and Body: 3cae2" are obtained.

Each characterization generated is added or integrated, and the characterization set for applying a signature to the integrated amount is generated (ST-SMTP1-5-1). In this example, the characterization for header information subject to originality guarantee (title (subject)) stores "hello" as it is, and a message digest value can be used (e.g. a hash value by one-way function). When message body information (Body) is recorded as it is, the amount of the information increases, so it is recommended that a message digest value (e.g. hash value by one-way function) be calculated.

The information is added to the beginning of the characterization such as Subject: hello, Body: 3cae2 so that which characterizations correspond to which items can be identified later. For the message body information, the characterization is generated by a hash function and is added to the beginning of the message body information (Body)

When the one-way hash function is used, information on the characterization is easily determined and generated if algorithm information to generate the one-way hash function such as MD-5, SHA-1, or SHA-256 is included.

In this example, it is assumed that SHA-1 is used as a generation algorithm, and has the message body information (Body): SHA-1:3cae2. Recording such additional information and using the information thereafter realizes easy identification of a keyword for a method to generate the characterization for message body information (Body), for search at verification, and for extracting header information subject to originality guarantee thereafter.

Next, verification information is added to the characterization set for applying a signature generated (ST-SMTP1-5-2). As specific examples of verification information, it is preferable to apply an electronic signature and a time stamp. Because the generated characterization set for applying a signature is verified later, it is required that no modification be made for the information. Here, it should be possible to confirm when and by whom the information was generated and that no modification has been made after the creation. The time stamp is used to ensure that a series of the characterization sets having a signature is created sequentially.

At this time, an electronic signature of SMTP server 1 is applied (ST-SMTP1-5-2). Then the generated characterization set for applying a signature with verification information is stored in header information within the electronic mail (ST-SMTP1-6).

In this embodiment, the characterization for applying a signature with verification information is stored within the header information as part of it; however, it is possible to collectively manage the characterizations in a different server. In this case, it is required to manage each characterization set for applying a signature by linking with relevant electronic mail. Therefore it is preferable for the characterization set for applying a signature with verification information to be stored sequentially into the header information of relevant electronic information and delivered.

When generation of the characterization set for applying a signature is completed by SMTP server 1 and relevant information is stored into the header information of electronic mail information, the mail is sent from SMTP server 1 to POP server 1 in Domain 2.

Figure 5:
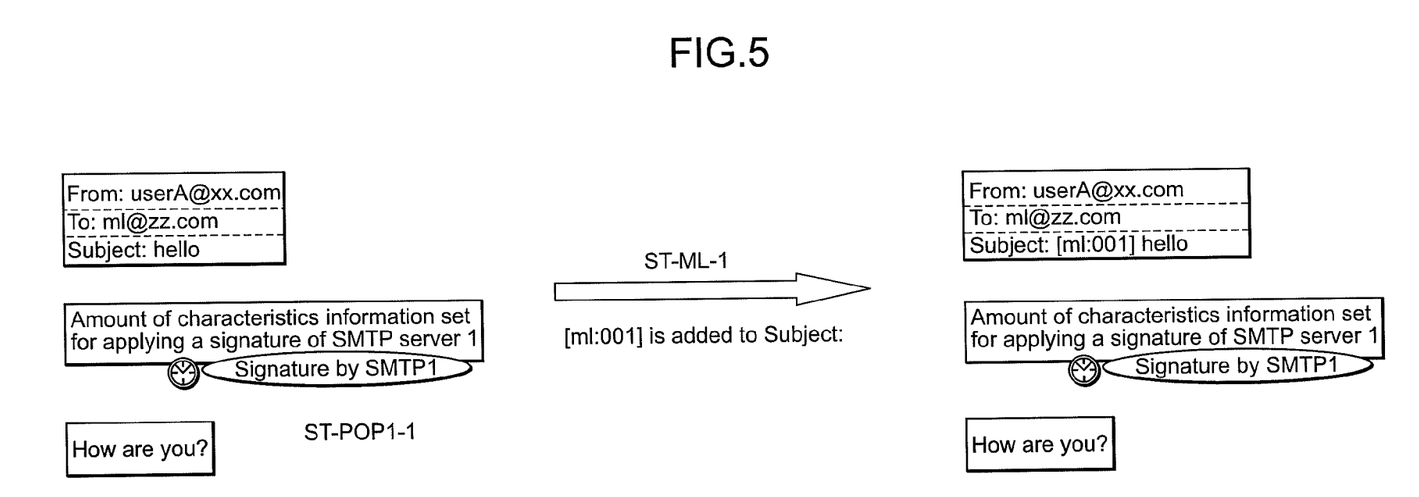
FIG. 5 is a diagram illustrating the process of POP server 1 and the ML server in Domain 2 according to the first embodiment.

FIG. 5 shows POP server 1 in Domain 2 and processing by the ML server. First, verification information (electronic signature and time stamp) added to the characterization set for applying a signature is verified to confirm that it is correct transmission information from SMTP server 1 (ST-POP1-1).

If verification fails here, this means some modifications have been made during the delivery, and User A (sender) will be notified of the failure. When the information is confirmed as correct, the broadcast mail to which (To): ml@zz.com is designated is transmitted to the ML server which manages the mail. A ML server which received a relevant broadcast mail will add "[ml:001]" indicating the ML item number in front of the original title (Subject) within the header information. It is standard operation for ML servers to change header information. In the case of the DKIM method in which signature is applied to header information and message text collectively, this general (standard) operation results in failure of verification.

The ML server which changed a title (Subject) transmits information on the relevant electronic mail to SMTP server 2.

Figure 6:
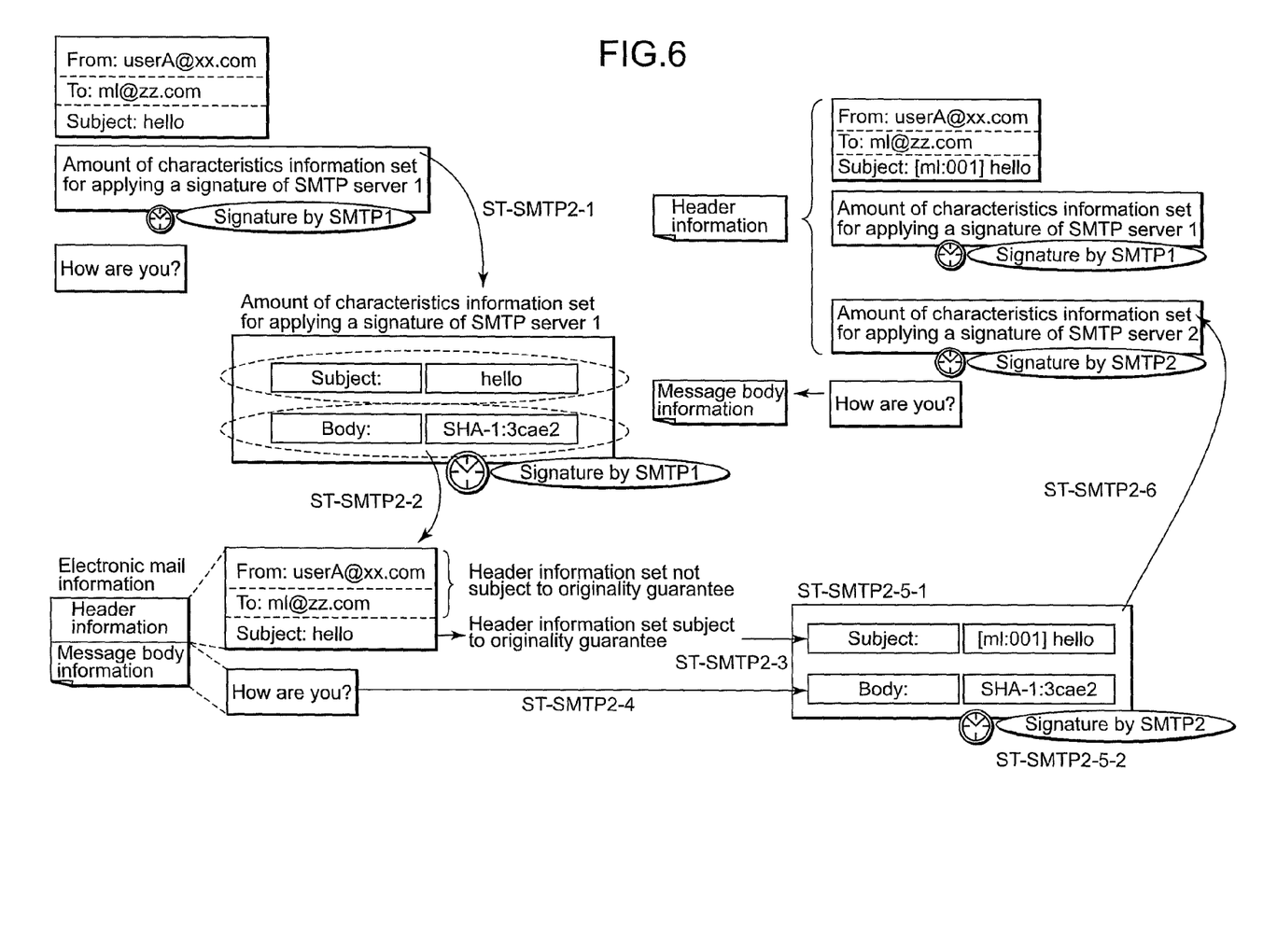
FIG. 6 is a flow chart illustrating the process to apply a signature by SMTP server 2 according to the first embodiment.

FIG. 6 shows how SMTP server 2 applies a signature in this embodiment. The item selection to extracts a header characterization set subject to the originality guarantee at SMTP server 2 is obtained from the characterization set for applying a signature stored during the process of applying a signature at SMTP server 1 (ST-SMTP2-1).

The characterization set for applying a signature in SMTP server 1 is referenced, and which item is selected is confirmed and recorded. Information on the body characterization of the message body information (Body) is obtained (ST-SMTP2-2). This example shows that the title (subject) is as it is and a message digest value is generated for message body information (Body) by using SHA-1.

Then the header characterization for the header information set subject to originality guarantee (ST-SMTP2-3) and body characterization for message body information (ST-SMTP2-4) are generated.

SHA-1 is added to the beginning additional information for message body information.

The generated body characterization and header characterization for each item are combined to generate the characterization set for applying a signature (ST-SMTP2-5-1). In this example, the characterization of "Subject: hello, Body: SHA-1:3cae2" is recorded.

Then verification information (an electronic signature and a time stamp) is added to the characterization set for applying a signature. The electronic signature applied here is that of SMTP server 2 (ST-SMTP2-5-2).

Next, the generated characterization set for applying a signature with verification information is stored into the header information within the electronic mail information (ST-SMTP2-6). At this time, the characterization set for applying a signature of SMTP server 1 has already been stored in the header information; the information stored previously is not overwritten, but stored sequentially by revision management.

Because a time stamp, which is part of the verification information, is applied, a time-series for previously stored characterization sets in SMTP server 1 can be confirmed later.

When application of signature is completed by SMTP server 2 and relevant information is stored into the header information of electronic mail information, the mail is sent from SMTP server 2 to POP server 2 in Domain 3.

Figure 7:
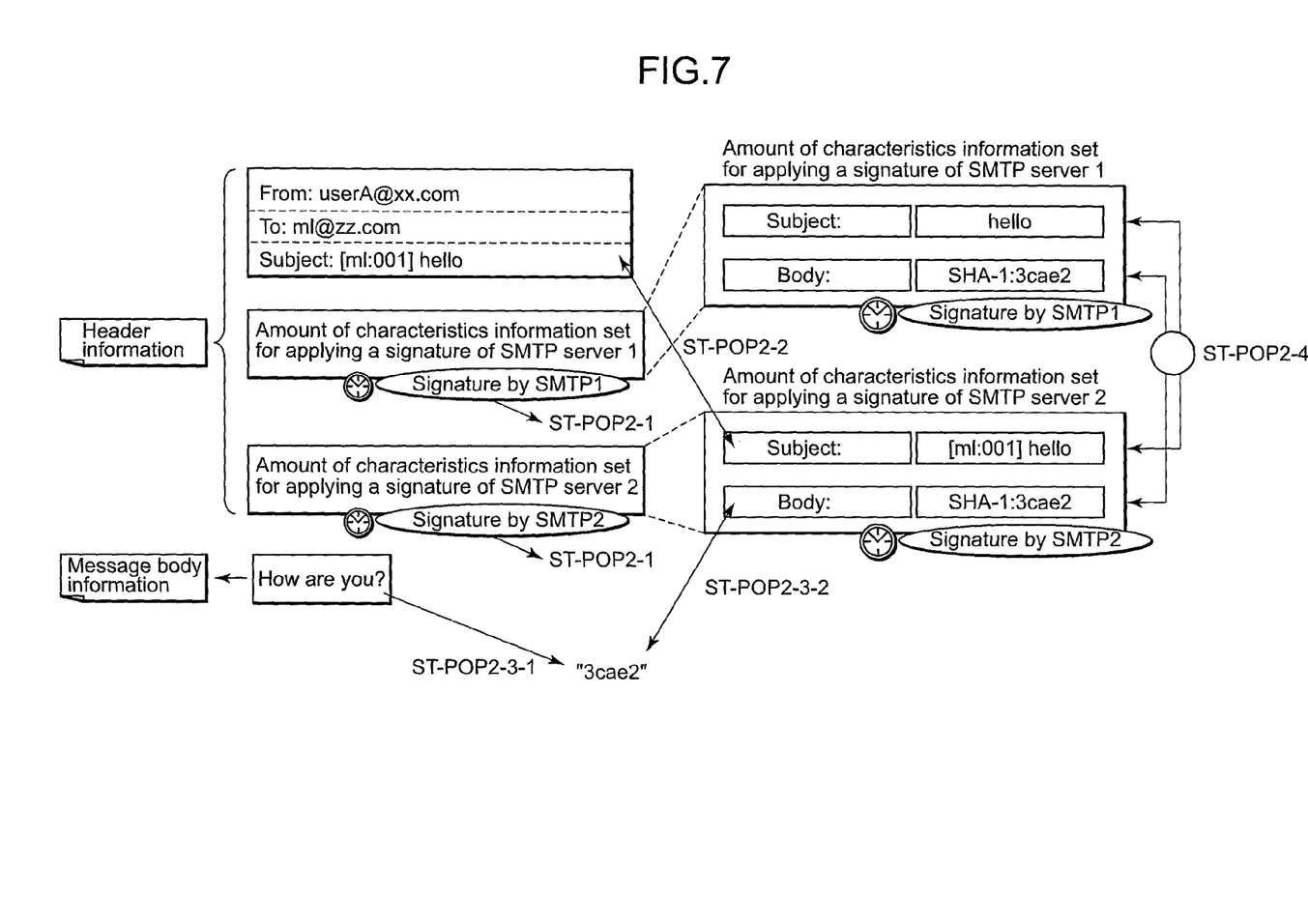
FIG. 7 is a diagram illustrating a process to verify a signature by POP server 2 according to the first embodiment.

POP server 2 extracts the characterization set in SMTP server 1 and that of SMTP server 2 from the header information of the received electronic mail, and then confirms who changed the electric mail at each delivery route. It also confirms the route which the mail followed and content verification of mail information (header information, and message body information).

FIG. 7 shows how POP server 2 verifies a signature in this embodiment.

First, verification information (an electronic signature, and a time stamp) applied to the characterization set in SMTP server 1 and that of SMTP server 2 are verified (ST-POP2-1).

If verification fails here, this means some modifications have been made during the delivery, and User B (recipient) will be notified of the failure. When the transmitted information is confirmed to be correct, the content of title (Subject) within the header information is extracted, and compared with title (Subject) in the header characterization ([ml:001] hello) recorded in the characterization set in SMTP server 2 (ST-POP2-2).

Then a hash value by SHA-1 is calculated from the message body information (Body) (ST-POP2-3-1) and the hash value is compared with the boy characterization ("3cae2") of the message body information (ST-POP2-3-1) recorded in the characterization set in SMTP server 2.

A hash value by SHA-1 is obtained from "Body: SHA-1: 3cae2" recorded in the characterization set for applying a signature in SMTP server 2.

If the comparison above shows the two values are different, it means some modifications have been made during the delivery, and User B (recipient) will be notified of the failure. When both values are identical, each characterization in the characterization set in SMTP server 1 and that of SMTP server 2 are compared and verified (ST-POP2-4).

As a result of this comparison and verification, POP server 2 can notify User B that the items shown below have occurred:

1) The mail is delivered by way of SMTP server 1 to SMTP server 2.

2) SMTP server 2 is added [ml:001] to the title (Subject).

3) The message body information has not been modified during the delivery.

As explained above, in this first embodiment, the verification by User B is enabled by recording the characterization set for applying a signature for title (Subject) and for message body information (Body), and then adding the characterization set for applying a signature.

The first embodiment only verifies title (Subject) and message body information (Body). Originality guarantee is not performed for the sender (From). As a result, spam mail that quotes a mail address from the header of another person's mail as the sender of spam mail cannot be prevented completely. The second embodiment described below is based on the assumption in which Sender (From) and titles (Subject) are rewritten by the ML server in Domain 2, and X-Org-From and X-Org-Subject are added.

In the first embodiment, a signature is applied to the message body information by SMTP server 1, and whether or not the signature is really applied by User A (sender) is not determined.

In the second embodiment, identity guarantee (sender guarantee) for message body information in addition to guarantee for the above header information is explained in detail.

Figure 8:
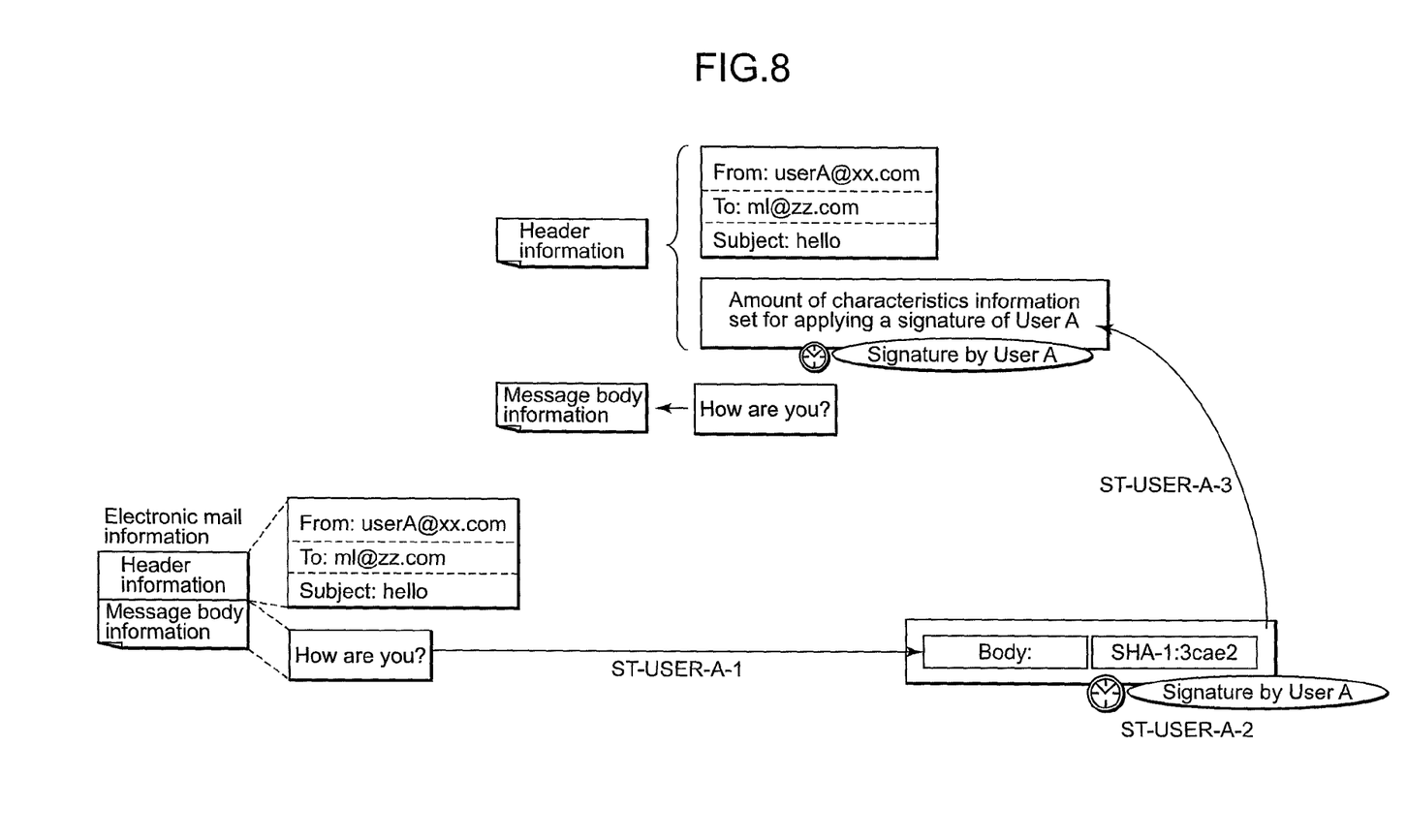
FIG. 8 is a diagram illustrating a process to apply a signature by User A (sender) in a second embodiment.

FIG. 8 shows how a signature is applied by User A (sender) in this embodiment. User A (sender) presses an execution button to apply a signature after creation of a mail so that the recipient can verify that the message body information is signed by User A (sender). This will generate a body characterization for message body information (Body) (ST-USER-A-1).

The purpose here is to apply a signature by User A (sender) for message body information, and no signature is applied for header information at this stage. As a result, the body characterization is in the characterization set for applying a signature.

Then verification information (electronic signature and time stamp) is added to the generated characterization set for applying a signature, and the electronic signature applied here is that of User A (sender) (ST-USER-A-2). The generated characterization set for applying a signature with verification information is stored in the header information of the electronic mail information (ST-USER-A-3).

Figure 9:
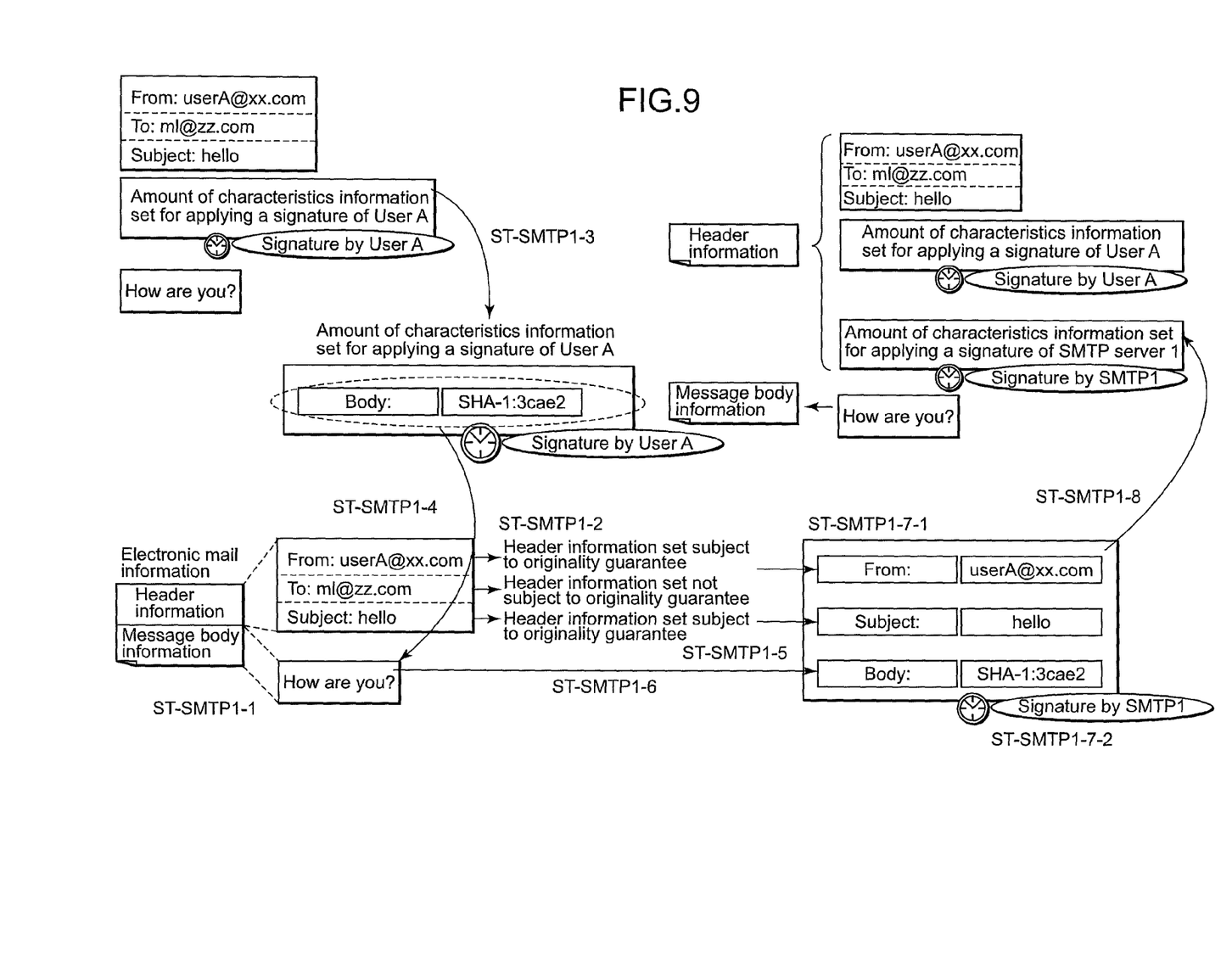
FIG. 9 is a diagram illustrating a process to apply a signature by SMTP server 1 in the second embodiment.

FIG. 9 illustrates how a signature is applied by the SMTP server 1 in this embodiment.

When User A (sender) creates a mail, applies a signature and presses the Execute button to transmit the mail, SMTP server 1 separates the header information and the message body information (ST-SMTP1-1), and extracts header information set subject to an originality guarantee (ST-SMTP1-2).

At this time, the header information set not subject to originality guarantee is address (To), while information subject to originality guarantee is sender (From), and title (Subject). Moreover the message body information (Body) is subject to originality guarantee as well. These selection settings are predefined in the mail system, or a sender selects and sets items subject to originality guarantee.

In this embodiment, message body information is also subject to guarantee, because User A (sender) has applied a signature beforehand. In this embodiment, address (To) is not specifically confirmed by User B (recipient), and the history of changes is given to the recipient in terms of sender (From), title (Subject) and message body information (Body).

The body characterization for message body information is generated at SMTP server 1 from the characterization set for applying a signature stored during the process of applying a signature by User A (sender) (ST-SMTP1-3).

The characterization set for applying signature information of User A (sender) is referenced, and information to generate a body characterization of the message body information (Body) is obtained (ST-SMTP1-4). This example shows that a message digest value is generated for message body information (Body) by using SHA-1. Then the header characterization for the header information set (sender (FROM)) subject to originality guarantee extracted at ST-SMTP1-2 is generated (ST-SMTP1-5) and a characterization for the message body is generated as well (ST-SMTP1-6).

SHA-1 is added to the beginning of the e-mail.

In this example, the characterization of "Subject: hello, Body: SHA-1:3cae2" is recorded.

Then verification information (an electronic signature and a time stamp) is added to the generated characterization set for applying a signature. The electronic signature applied here is that of SMTP server 1 (ST-SMTP1-7-2). Next, the generated characterization set for applying a signature with verification information is stored into the header information of the electronic mail information (ST-SMTP1-8).

At this time, the characterization set for applying a signature of User A (sender) has already been stored in the header information; the characterization set for applying a signature stored previously is not overwritten, but is stored sequentially by revision management. Because a time stamp, which is part of the verification information, is applied, the time-series for previously stored characterization sets can be confirmed later.

When application of a signature is completed by SMTP server 1 and relevant information is stored into the header information of electronic mail information, the mail is sent from SMTP server 1 to POP server 1 in Domain 2.

Figure 10:
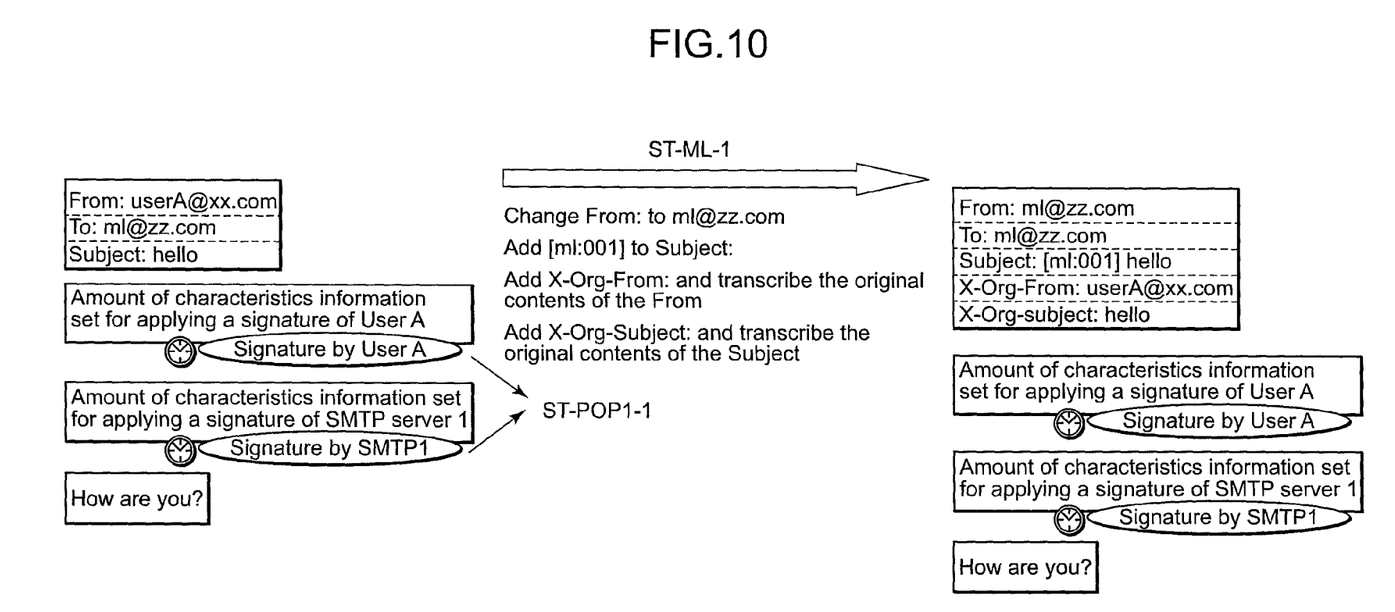
FIG. 10 is a diagram illustrating a process to apply a signature by POP server 1 and the ML server in Domain 2 in the second embodiment.

FIG. 10 shows POP server 1 in Domain 2 and processing by ML server. First, verification information (electronic signature and time stamp) added to the characterization set for applying a signature of User A (sender) and that of SMTP server 1 are verified to confirm whether or not the information is correct transmission information from SMTP server 1 (ST-POP1-1).

If verification fails here, this means some modifications have been made during the delivery, and User A (sender) will be notified of the failure. When the information is confirmed as correct, the broadcast mail to which (To): ml@zz.com is designated is transmitted to the ML server which manages the mail.

The ML server which received relevant broadcast mail changes sender (From) in the header information to ml@zz.com and adds "[ml:001]" indicating the ML item number in front of the original title. Moreover X-Org-From and X-Org-Subject are also added by transcribing the original content of sender (From) and title (Subject) respectively. The ML server which changed header information transmits information on the relevant electronic mail to SMTP server 2.

Figure 11:
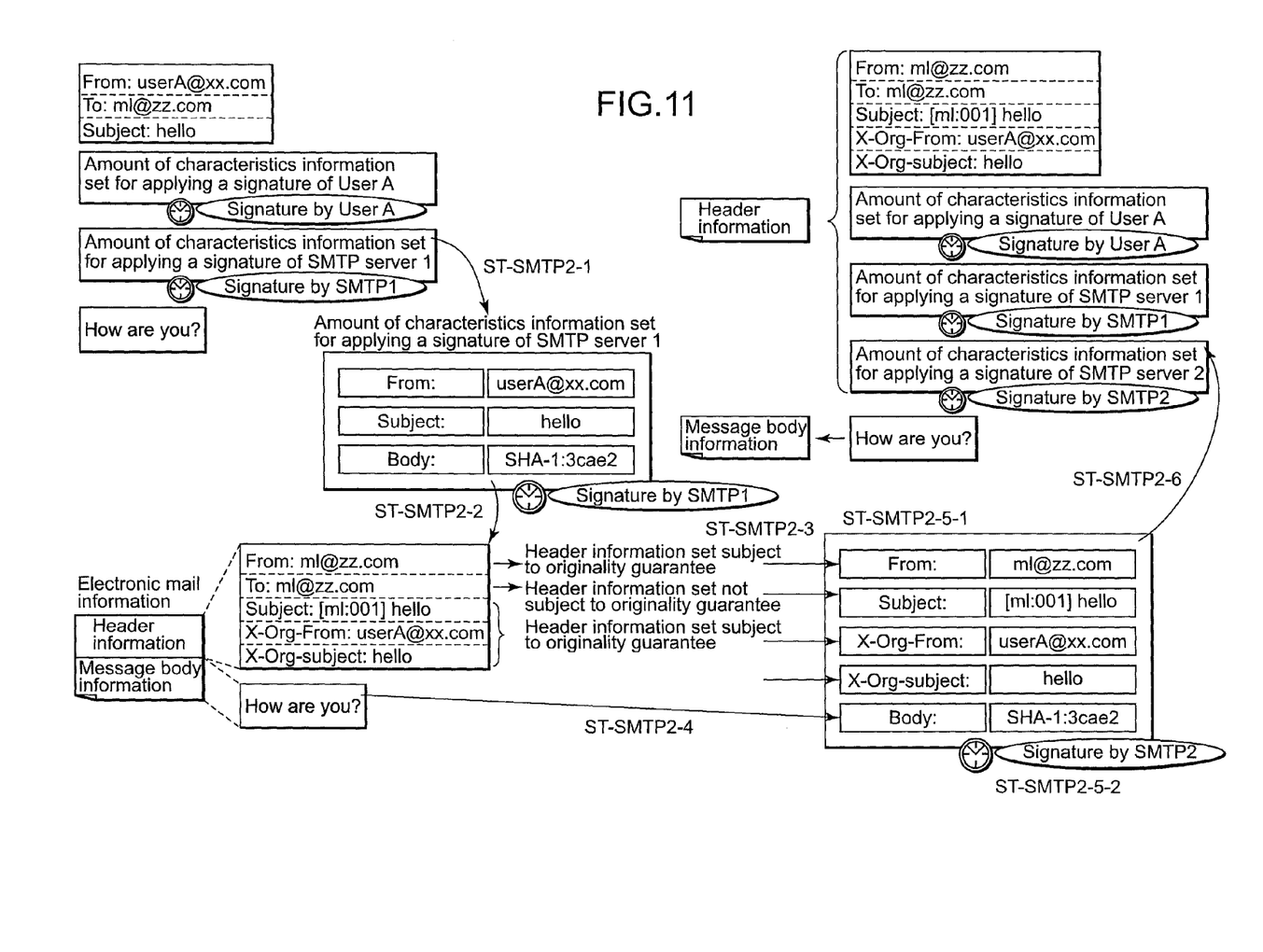
FIG. 11 is a diagram illustrating a process to apply a signature by SMTP server 2 in the second embodiment.

FIG. 11 shows how SMTP server 2 applies a signature in this embodiment.

The item selection to extract header information subject to originality guarantee is obtained from the characterization set stored during the process of applying signature at SMTP server 1 (ST-SMTP2-1).

The information set is referenced, the server confirms which item is recorded, and the body characterization for message body information (Body) is obtained as well (ST-SMTP2-1).

This example shows that title (subject) is used as it is and a message digest value is generated for message body information (Body) by using SHA-1. Moreover, X-Org-From and X-Org-Subject which have not been recorded in the characterization set are newly added at this stage as a header information set subject to originality guarantee. These selection settings can be predefined in the mail system, or a sender selects and sets items subject to originality guarantee.

Then a header characterization for the confirmed header information set subject to originality guarantee (sender (From), title (Subject), X-Org-From, and X-Org-Subject) (ST-SMTP2-3) and that for message body information (ST-SMTP2-4) are generated as well.

SHA-1 adds to the beginning of the electric mail additional information regarding the body characterization information. The generated information on characterization for each item is combined to generate a characterization set for applying a signature (ST-SMTP2-5-1).

In this example, the characterization of "From: ml@zz.com, Subject: [ml:001] hello, X-Org-From: userA@xx.com, X-Org-Subject: hello, Body: SHA-1:3cae2" is recorded. Then verification information (an electronic signature and a time stamp) is added to the generated characterization set for applying a signature. The electronic signature applied here is that of SMTP server 2 (ST-SMTP2-5-2). Next, the generated characterization set for applying a signature with verification information is stored into the header information of electronic mail information (ST-SMTP2-6).

At this time, the characterization set for applying a signature of User A and that of SMTP server 1 has already been stored in the header information in the electronic mail; the characterization set for applying a signature stored previously is not overwritten, but stored sequentially by revision management.

Because a time stamp, which is part of the verification information, is applied, time-series for the previously stored two characterization sets can be confirmed later.

When application of signature is completed by SMTP server 2 and relevant information is stored into the header information of electronic mail information, the mail is sent from SMTP server 2 to POP server 2 in Domain 3.

Figure 12:
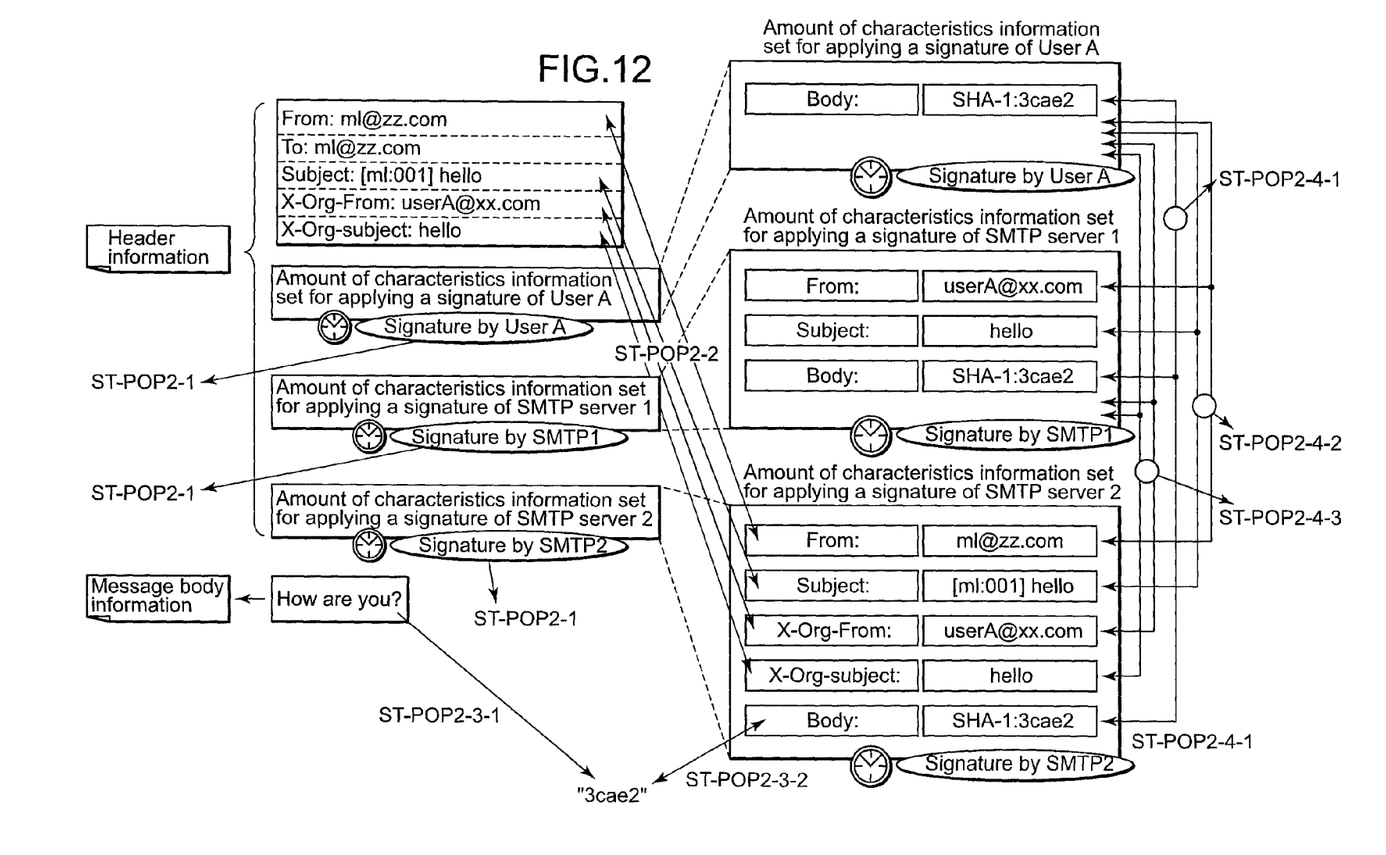
FIG. 12 is a diagram illustrating a process to verify a signature by POP server 2 according to the second embodiment

POP server 2 extracts characterization sets for applying a signature of User A (sender), that of SMTP server 1 and that of SMTP server 2 from the header information of the received electronic mail, and then confirms the persons who changed the e-mail at each delivery route, the route which the mail followed and the content of mail information (header information, and message body information) as well.

FIG. 12 shows how POP server 2 verifies a signature in this embodiment.

First, verification information (an electronic signature and a time stamp) applied to the characterization set for applying a signature of User A (sender), that of SMTP server 1 and that of SMTP server 2 are verified (ST-POP2-1).

If verification fails here, this means some modifications have been made during the delivery. User B (recipient) will be notified of the failure.

When the transmitted information is confirmed to be correct, the content of sender (From), title (Subject), X-Org-From, and X-Org-Subject within the header information are extracted, and compared with sender (From), title (Subject), X-Org-From, and X-Org-Subject within the characterization set for applying a signature recorded in SMTP server 2 (ST-POP2-2). Then a hash value by SHA-1 is calculated from the message body information (Body) (ST-POP2-3-1) and compared with the hash value ("3cae2") of message body information (ST-POP2-3-2) recorded in the characterization set for applying a signature in SMTP server 2 (ST-POP2-3-2).

A hash value by SHA-1 is calculated here to generate a body characterization for the message body information (Body), and the value can be obtained from "Body: SHA-1: 3cae2" recorded in the characterization set for applying a signature in SMTP server 2.

In the case that the comparison above shows the two values are different, it means some modifications have been made during the delivery, and User B (recipient) will be notified of the failure. When both values are identical, each characterization set for applying a signature of User A (sender), that of SMTP server 1 and that of SMTP server 2 are compared and verified.

The items shown below can be confirmed by Verification at ST-POP2-4-1.
1) The body characterization of message body information (Body) for User A (sender), SMTP server 1, and SMTP server 2 are identical; "3cae2".
2) For verification at ST-POP2-4-2, the characterization set for applying a signature for User A does not include sender (From), and title (Subject), and these are added by SMTP server 1, and then sender (From) and title (Subject) are changed by SMTP server 2.

3) For verification at ST-POP 2-4-3, the characterization sets for applying a signature for User A (sender) and that of SMTP server 1 do not include X-Org-From, and X-Org-Subject, and these are added by SMTP server 2.

4) For changed content, the person who changed the content at each delivery route, the route which the mail followed, and the content of mail information (header information, and message body information) can be confirmed by using each characterization set for applying a signature, and verification information added to the characterization set for applying a signature.

As a result of this comparison and verification, POP server 2 can notify User B of the items below as follows.

1) The mail was delivered by way of SMTP server 1 to SMTP server 2.
2) SMTP server 1 added sender (From), and title (Subject)
3) SMTP server 2 changed sender (From); from userA@xx.com to ml@zz.com.
4) SMTP server 2 added [ml:001] to the title (Subject)
5) Content of message body information that was created by User A (sender) with a notation that no change has been made during delivery.
6) Content of message body information created by User A (sender) and sent from userA@xx.com.
7) X-Org-From and X-Org-Subject were added by SMTP server 2 and the information was correctly transcribed from the original.

As described above, the second embodiment can provide more strict content verification for a person who changed the e-mail, as compared with the first embodiment.

As described in detail the above, this embodiment enables the following verification by a mail recipient; whether a person changed the electronic mail at each delivery route, the route which the mail followed and content verification of mail information (header information, and message body information). The content of the verification can be proved to a third party. This embodiment can provide both legitimacy verification of a sender mail server and contents guarantee for a mail content (including sender, address, and title and message body information).

What is claimed is:

1. A non-transitory computer-readable medium storing a program controlling a computer, the program causing the computer to generate verification information to verify changes made by mail servers during the delivery of an electronic mail by:
    extracting header information from the electronic mail, further extracting header information subject to originality guarantee from the extracted header information, and then generating a header characterization for the header information subject to the originality guarantee, and extracting message body information from the electronic mail and generating a body characterization for the message body information as well;
    generating a characterization set for applying a signature by combining the header characterization and the body characterization;
    adding verification information including the signature to said generated characterization set;
    linking said characterization set, including the verification information, to the electronic mail;
    managing the characterization set for applying the signature, including managing revisions of the characterization set generated at said process of generating the characterization set for applying the signature; and
    prior to generating the header characterization for a received electronic mail, extracting all of the characterization sets for applying the signatures including the verification information added by all of the computers located on routes of the delivery from the header information of the received electronic mail, comparing the extracted characterization sets for applying the signatures to each other, and confirming whether or not any change has been made for each of the characterization sets.

2. The non-transitory computer-readable storage medium according to claim 1, wherein a managing characterization set for applying a signature is enabled by storing the characterization set for applying a signature with verification information added into the header information of the electronic mail, and thereby linking said characterization set to said electronic mail.

3. The non-transitory computer-readable storage medium according to claim 1, wherein said generating characterization adds item information to the characterization of the body information of the electronic mail.

4. The non-transitory computer-readable storage medium according to claim 3, wherein the body characterization for message body information and said item information is added to the received electronic mail,
    said generating characterization generates the body characterization for message body information of the electronic mail based on said item information added to said electronic mail.

5. An apparatus for generating verification information to verify changes made by mail servers during the delivery of an electronic mail, the apparatus comprising a computer configured to execute a process including:
    generating a header characterization by extracting header information from said electronic mail, and further extracting the header information subject to originality guarantee which is required for originality guarantee, from the extracted header information to generate the characterization extracting message body information from said electronic mail information to generate a body characterization for the message body information,
    generating a characterization set for applying a signature by combining the header characterization and the body characterization
    adding verification information including the signature to said generated characterization set for applying a signature,
    linking said characterization set, including the verification information, to the electronic mail,
    managing the characterization set for applying a signature, including managing revisions of the characterization set for applying the signature of said electronic mail, and
    prior to generating the header characterization for a received electronic mail, extracting all of the characterization sets for applying the signatures including the verification information added by all of the computers located on routes of the delivery from the header information of the received electronic mail, comparing the extracted characterization sets for applying the signatures to each other, and confirming whether or not any change has been made for each of the characterization sets.

6. An apparatus according to claim 5, wherein said managing the characterization set for applying a signature is enabled by storing said characterization set for applying a signature with verification information added into the header information of said electronic mail and thereby linking said characterization set for applying signature information to said electronic mail.

7. An apparatus according to claim 5, wherein said generating a header characterization adds item information to the characterization of the body information of the electronic mail.

8. An apparatus generating verification information for electronic mail according to claim 7, where a received electronic mail includes the characterization of the message body information, said item information, and a signature of a sender of said electronic mail, and said generating characterization generates the message body of the electronic mail based on said item information added to said electronic mail.

9. A method to generate verification information to verify changes made by mail servers during the delivery of an electronic mail comprising:

extracting the header information from said electronic mail information and from the extracted header, further extracting header information subject to originality guarantee which is required for the originality guarantee and generating a header characterization for the header information subject to originality guarantee, and extracting message body information from said electronic mail information and generating the characterization for the message body information, generating a characterization set for applying a signature by combining the header characterization and the body characterization, adding verification information including the signature to said characterization set for applying a signature, linking the characterization set with the verification information to said electronic mail, managing the characterization set for applying the signature, including managing revisions of the characterization set generated at said process of generating the characterization set for applying the signature; and prior to generating the header characterization for a received electronic mail, extracting, by a computer, all of the characterization sets for applying the signatures including the verification information added by all of the computers located on routes of the delivery from the header information of the received electronic mail, comparing the extracted characterization sets for applying the signatures to each other, and confirming whether or not any change has been made for each of the characterization sets.

10. A method to generate verification information to verify an electronic mail according to claim 9, wherein said managing characterization set for applying a signature is enabled by storing the characterization set for applying a signature with verification information added at said adding verification information into the header information of said electronic mail and thereby linking a characterization set for applying signature information to said electronic mail.

11. A method to generate verification information to verify an electronic mail according to claim 9, wherein said generating characterization adds item information to the characterization of the body information.

12. A method to generate verification information to verify an electronic mail according to claim 11, where the received electronic mail includes the characterization of the message body information, said item information, and a signature of sender of said electronic mail, said generating characterization generates the body characterization for message body information of the electronic mail based on said item information added to said electronic mail.

13. A method of generating verification information for electronic mail according to 9, wherein prior to said generating the characterization for a received mail with verification information, comparing all of said characterization sets having a signature and confirming whether or not any change has been made for each character information set.

* * * * *